United States Patent
Dusterhoff (10) Patent No.: US 7,881,940 B2
(45) Date of Patent: Feb. 1, 2011

(54) CONTROL SYSTEM

(75) Inventor: Kurt E. Dusterhoff, Evesham (GB)

(73) Assignee: DENSO CORPORATION, Kariya (JP)

( * ) Notice: Subject to any disclaimer, the term of this patent is extended or adjusted under 35 U.S.C. 154(b) by 908 days.

(21) Appl. No.: 11/798,507

(22) Filed: May 15, 2007

(65) Prior Publication Data

US 2008/0091433 A1  Apr. 17, 2008

(30) Foreign Application Priority Data

Aug. 10, 2006 (GB) ................... 0615917.2

(51) Int. Cl.
*G10L 15/00* (2006.01)
(52) U.S. Cl. .................. 704/275; 704/260; 705/23; 705/25
(58) Field of Classification Search ............. 704/275, 704/260; 705/23, 25
See application file for complete search history.

(56) References Cited

U.S. PATENT DOCUMENTS

| 6,240,347 | B1 | 5/2001 | Everhart et al. |
| 2002/0062216 | A1* | 5/2002 | Guenther et al. ......... 704/270.1 |
| 2002/0065584 | A1 | 5/2002 | Kellner et al. |
| 2004/0236574 | A1* | 11/2004 | Ativanichayaphong et al. ........... 704/231 |
| 2005/0091057 | A1 | 4/2005 | Phillips et al. |
| 2005/0144036 | A1* | 6/2005 | Bell et al. ............. 705/1 |
| 2007/0005206 | A1* | 1/2007 | Zhang et al. ............ 701/36 |
| 2007/0050191 | A1* | 3/2007 | Weider et al. ........... 704/275 |

FOREIGN PATENT DOCUMENTS

| JP | 2001-282284 | 10/2001 |
| JP | 2003-162295 | 6/2003 |
| JP | 2005-215474 | 8/2005 |
| WO | WO 02/033942 A1 | 4/2002 |
| WO | WO 2004/104520 A1 | 12/2004 |

OTHER PUBLICATIONS

Search Report under Section 17(5) issued from the British Patent Office in the corresponding British Application No. GB 0615917.2 dated Oct. 24, 2006.

* cited by examiner

*Primary Examiner*—Daniel D Abebe
(74) *Attorney, Agent, or Firm*—Posz Law Group, PLC (57) ABSTRACT

A system has a speech control interface operable to provide a speech sequence to which a user response is required before system functionality is operational. A user response can be provided via a spoken command. The system is operable, in response to interruption of the speech sequence to permit a non-verbal user response using an alternative interface.

24 Claims, 7 Drawing Sheets

CONTROL SYSTEM

CROSS REFERENCE TO RELATED APPLICATION

The present application is related to, claims priority from and incorporates by reference United Kingdom Patent Application No. 0615917.2, filed on Aug. 10, 2006.

TECHNICAL FIELD

The present invention relates to control systems, and in particular to a control system for a motor vehicle navigation system.

BACKGROUND

When a user must input information into a system such as a vehicle navigation system, there is a need to inform or instruct the user of the substance of the information to be input.

For example, a vehicle navigation system typically requires confirmation from a user that the user is aware of and accepts conditions regarding the use of the system. The conditions of use can be presented in the form of a disclaimer, in response to which the user is required to input an acknowledgement of acceptance of the disclaimer.

It is known to provide a disclaimer on the display of the navigation system, whereby the user can read the disclaimer prior to operating the navigation system. It is also known to provide the disclaimer in the form of speech interaction, whereby the navigation system reads, or speaks the disclaimer to the user, for example, via the vehicle audio system. Where speech interaction for a disclaimer is provided, multiple modes of presenting the disclaimer (e.g., speech and display) and/or multiple modes of responding to the disclaimer (for example by a voice activation command, touching a button displayed on a touch sensitive navigation screen, or operating a control switch or button on a vehicle dashboard or steering wheel or the like) can be provided.

An advantage of the use of speech interaction for the disclaimer is that the driver of a vehicle does not need to look at a display to read the disclaimer. However, a disadvantage of presenting the disclaimer via speech is that it takes time to convey the disclaimer. A technical problem that arises in such a case is that the presentation of the disclaimer in verbal form (i.e. using speech) is that the speech interaction may be interrupted by, for example, receipt of a call on a vehicle telephone, receipt of a warning signal in response to a fault condition relating to a vehicle system, or receipt of a user input.

In a known system, it is necessary for the user to employ some other form of interface to accept the disclaimer and/or to restart the speech interaction once the disclaimer has been accepted.

In another known system, a user is required to listen to a disclaimer and then to accept the disclaimer. However, there can be circumstances where a user would prefer to read the disclaimer and touch a button on a screen, dashboard, steering wheel, or the like. Also, there can be situations as mentioned above where other components can interrupt the speech interaction. As a result, a user can potentially listen to an entire disclaimer and then still not be able to continue the speech interaction due to some higher priority function having taken over control of the speech control interface.

Accordingly, an embodiment of the invention seeks to mitigate at least some of the technical problems discussed above.

SUMMARY

In view of the above limitations, one exemplary embodiment provides a system with a speech control interface that is operable to provide a speech sequence to which a user response is required before system functionality is operational. An alternative interface is operable to permit the user response to be a non-verbal user response to the speech sequence. The user response can be provided either via a spoken command or, in response to interruption of the speech sequence, via the alternative interface.

Another exemplary embodiment provides a system with a speech control interface that is operable to provide a disclaimer in the form of a speech sequence for which a user acknowledgement is required before system functionality is operational. A memory stores a command input before the user acknowledgement, and a processor is operable to receive the user acknowledgement and to execute the command after receiving the user acknowledgement.

Another exemplary embodiment provides a method of operating a system that includes a speech control interface by providing a speech sequence to which a user response is required before system functionality is operational, wherein the user response can be provided via a spoken command, and in response to interruption of the speech sequence, permitting a user response using an alternative interface.

The aforementioned exemplary embodiments may be implemented in a navigation system for a vehicle, a vehicle including such a navigation system, or a computer program product for carrying out the aforementioned method.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE DRAWINGS

Specific exemplary embodiments will now be described by way of example only with reference to the accompanying figures in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
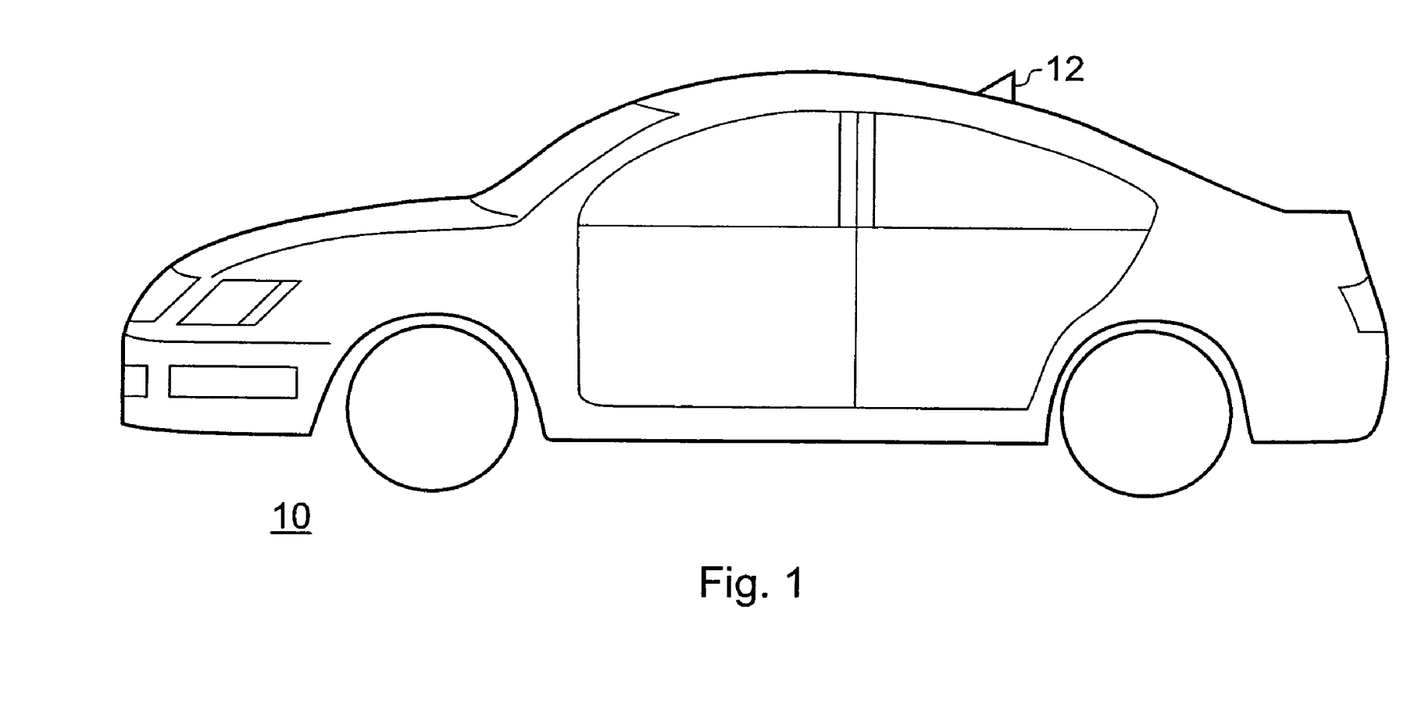
FIG. 1 is a schematic representation of a motor vehicle.

Referring now to the drawings, FIG. 1 is a schematic representation of a motor vehicle 10. The motor vehicle 10 is equipped with a navigation system as will be discussed in detail below and includes an aerial 12 adapted to receive satellite positioning signals, for example satellite positioning signals from the Global Position System (GPS).

Figure 2:
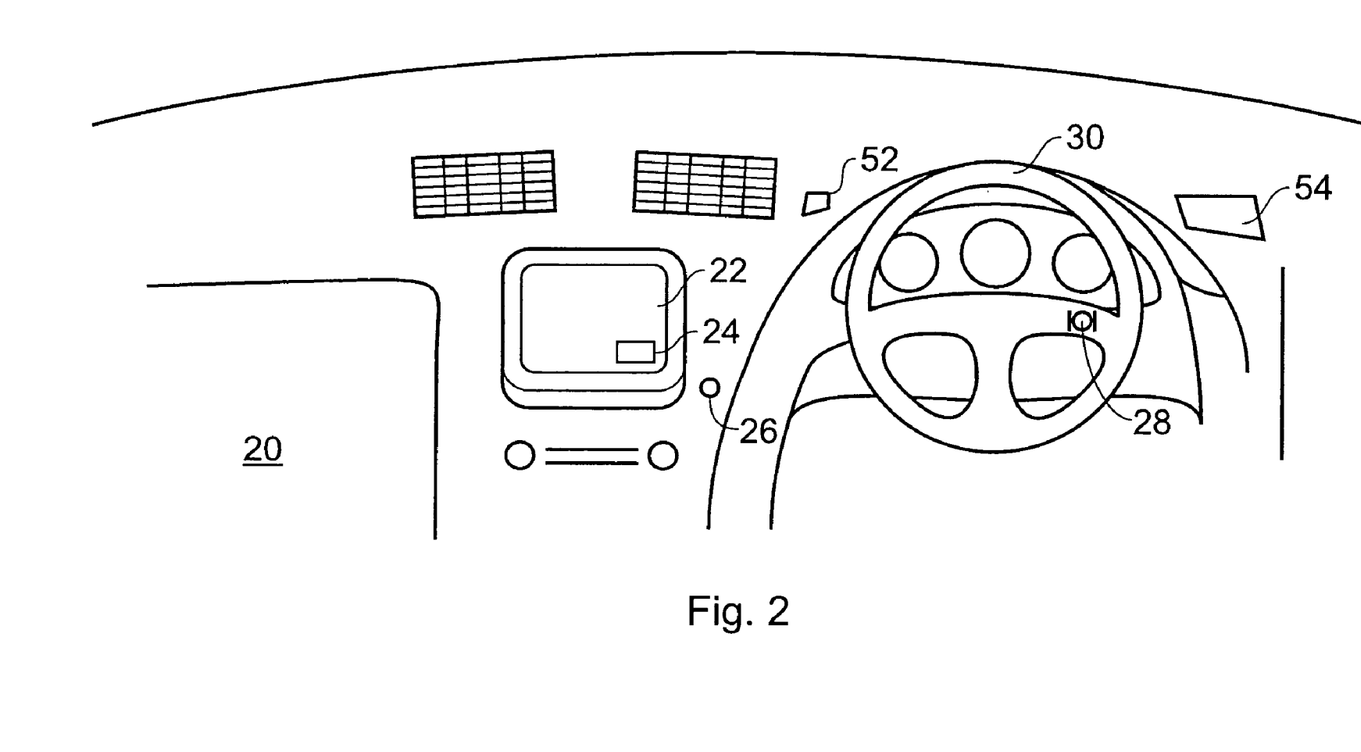
FIG. 2 is a schematic representation of a dashboard of a motor vehicle.

FIG. 2 is a schematic representation of part of a dashboard 20 of a vehicle such as the vehicle 10 shown in FIG. 1. Only components relevant to an understanding of exemplary embodiments discussed below are identified specifically in FIG. 2.

A touch screen display 22 is provided for displaying mapping information, instructions, and other data for the navigation system, and possibly for the display of data for other vehicle systems, such as, for example, the display of vehicle telephone information, diagnostic information and vehicle computer data. The touch screen 22 is capable of displaying a representation of a button such as the button 24, which can be activated by the user touching the screen. This forms one type of user input interface for the exemplary embodiments as will be discussed below.

Conventional input control buttons, such as a button or switch 26 on the dashboard, or a button or switch 28 on the steering wheel, can also be provided as a user input interface. Also, the navigation system can be provided with a speech control interface, whereby information can be output by the navigation system through a speaker (for example a speaker 54), and instructions can be given to the navigation system and to other vehicle systems via a microphone 52.

It should be noted that the positioning of the various components on the dashboard is merely for illustrative purposes and that the individual components can be provided at other locations on the dashboard and/or the steering wheel and/or at other positions within the vehicle.

Figure 3:
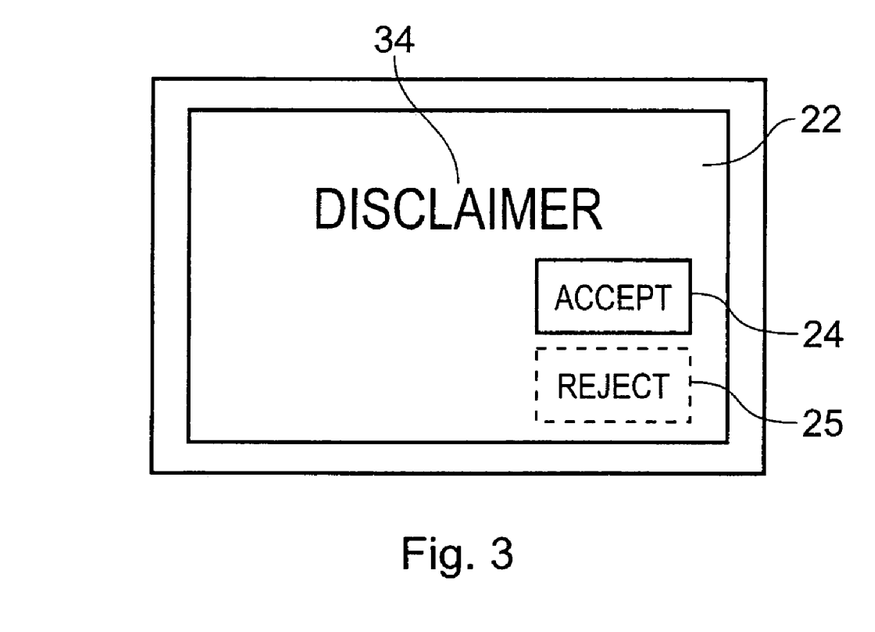
FIG. 3 is a schematic representation of a display of a satellite navigation system of the motor vehicle of FIG. 1.

FIG. 3 is a representation of the display of a disclaimer 34 on the navigation system display screen 22. Although, in FIG. 3, only the word "disclaimer" is shown displayed on the display screen, in fact the disclaimer would normally include one or more sentences or bullet points indicating conditions of use and/or warnings for the user in connection with the operation of the navigation system and/or other systems within the vehicle. FIG. 3 also represents the display of an "Accept" button 24, which needs to be operated by the user to accept the disclaimer 34. Optionally, a "Reject" button 25 can also be displayed, whereby the user could reject the disclaimer by operating the reject button 25. Typically, the user is able to accept or reject the disclaimer by pressing one or more buttons on the dashboard, steering wheel, or elsewhere, such as for example the buttons or switches 26 and 28 in FIG. 1.

Figure 4:
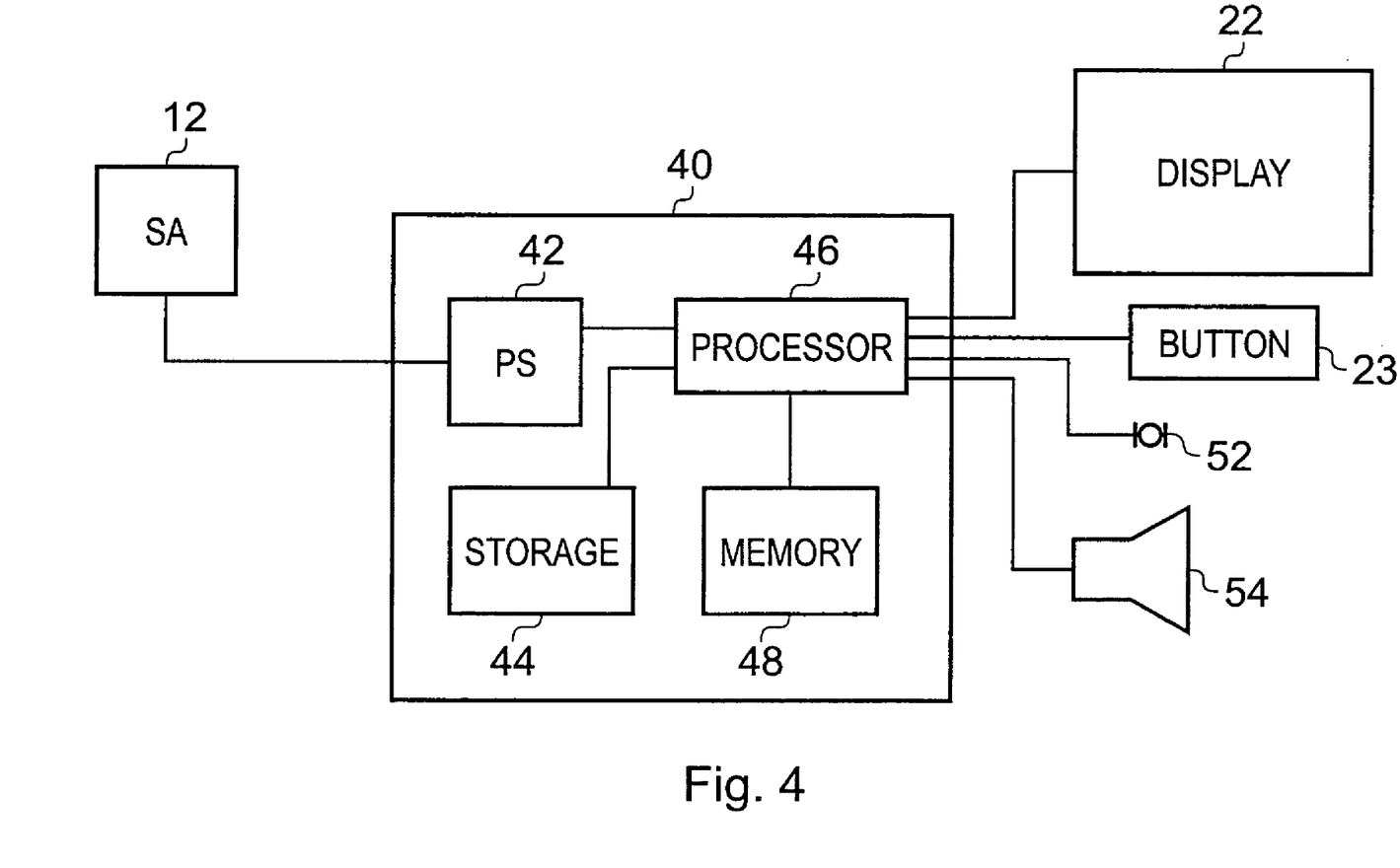
FIG. 4 is a schematic block diagram of aspects of a navigation system including a speech control interface.

FIG. 4 is a schematic representation of components of an exemplary navigation system as discussed with respect to the preceding figures.

The navigation system 40 includes a positioning system (PS) 42 such as, for example, a GPS system which is responsive to signals received via the satellite antenna 12 to determine the current position of the vehicle from signals received from the satellite antenna 12. A processor 46 is responsive to the output of the positioning system 42 and to data stored in storage 44 and in memory 48 to carry out functions based on the information received from the positioning system 42. The processor 46 can be in the form of a microprocessor, a microcontroller, or other processing unit, and can be responsive to programs and information held in the storage 44 and/or in the memory 48.

The processor 46 can be responsive to signals detected from various components and systems within the vehicle, but in the present instance only the connections to those components which are relevant for an understanding of the present invention are represented. In particular, the processor 46 is responsive to signals from one or more buttons 23 (button 23 is used in FIG. 4 to represent one or more or all of the buttons and/or switches 24, 25, 26 and 28 represented in the preceding figures), and to a microphone 52 for speech input from the user. The processor 46 is also operable to output information to the display 22 and to output audio information to the speaker 54.

It should be appreciated that FIG. 4 is a schematic representation only of an exemplary system configuration. Rather than the various input output devices 22, 23, 52 and 54 being connected directly to the CPU 46, they can be connected by various adaptors and/or interfaces to optimize the flow of information to and from the processor 46. The storage device 44, CPU 46, and memory 48, along with the input output devices 22, 23, 52 and 54 form a speech control interface.

Some current navigation, television and camera systems require a user to accept conditions shown in a disclaimer message prior to the user being able to access those systems. Some of these disclaimers must be accepted before the user may access the system, regardless of the mode of entry. For example, some current navigation systems only allow the navigation system to be used after acceptance of an appropriate printed warning, the acceptance being given by operating a displayed button on a touch screen, or by means of a physical switch.

An exemplary embodiment enables the user to accept a disclaimer via a speech control interface. In an exemplary system to be described, the user may accept the disclaimer when it interrupts the user's access to a system via a speech control interface. A disclaimer may be accepted using any of the available interface methods within the system. The speech control session that caused the disclaimer interruption can continue, be acted on, or can be replaced by another user-initiated or system-initiated request.

Figure 5:
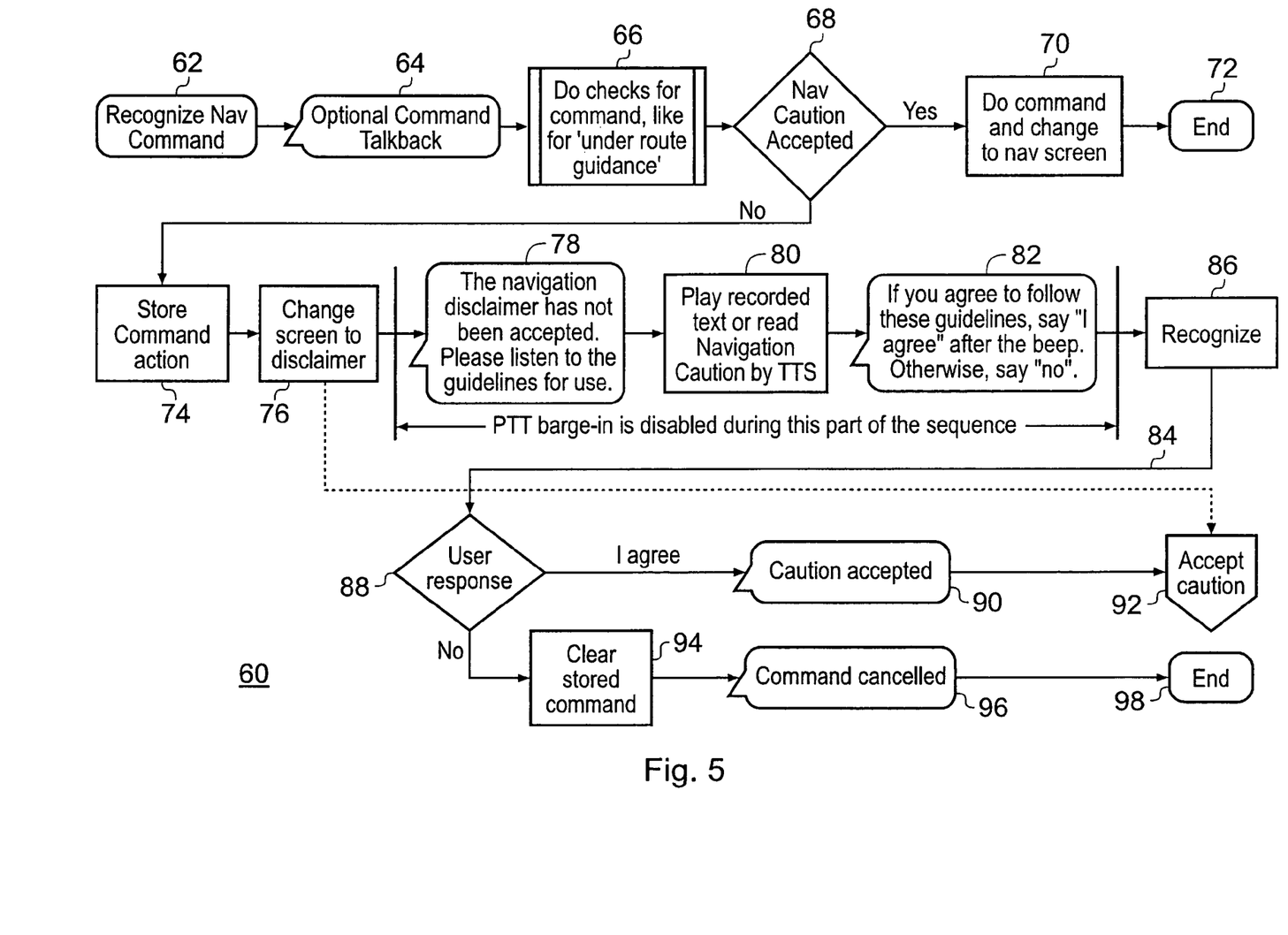
FIG. 5 is a flow diagram illustrating exemplary operation of the navigation system of FIG. 4.

FIG. 5 is a flow diagram illustrating at 60 the exemplary operation of a navigation system described above.

At 62, the navigation system 40 recognizes a navigation command. At 64, an optional command talk back can be provided (in other words, the navigation command can be read or spoken to the user by the navigation system). At 66, the system completes the status checks for the disclaimer. For example, checks are provided for the command, such as for "under route guidance." At 68, if the status is accepted, then at 70, the command is executed and the navigation screen is changed to a normal navigation screen, and at 72 the process ends. Alternatively, at 68, if the navigation status is not accepted, then 74 follows.

At 74, the command action is stored, for example, in the memory 48 or the storage 44, to inform the system of the function to be activated once the disclaimer has been accepted. At 76, the screen is changed to show the disclaimer, and the system begins to play the disclaimer message. During the playing of the message, other systems may cause the speech interaction to end. In this case, the user may later accept the disclaimer via a different interface. It is also possible during the playing of the message, that the user may accept the disclaimer via a different interface (for example using a button 24 displayed on the touch screen 22, or one of the switches or buttons 26 and 28 illustrated in FIG. 2).

Accordingly, at any point after 76 during the process represented in FIG. 5, the user may accept the disclaimer via an alternative non-speech interface, ending the voice session without losing the voice command and/or a higher priority module may cause the voice session to end with out losing the voice command. In the latter case, to continue with the voice command, the user can accept the disclaimer via an alternative non-speech interface.

The process stage 84 represents the audible or speech presentation of the disclaimer. Accordingly, at 78 the speech control interface of the navigation system indicates to the user by voicing that the navigation disclaimer has not been accepted and invites the user to listen to the guidelines for use. At 80, the recorded text is played by the navigation system over the speech control interface. At 82, the navigation system invites the user to accept the guidelines for use by saying, for example, "I agree" or "yes" after a beep, or otherwise saying "no" after the beep. During the stage 84, that is, during the disclaimer playback, the speech activation button is disabled to prevent a user activating this button to skip the audio playback and go to the next state.

At 86 the voice input of the user is recognized following the beep. At 88 the user response is analyzed. If, for example, the user response is "I agree" or "yes," then at 90 the system is operable to voice to the user that the caution has been accepted, and at 92, the system recognizes the caution as having been accepted.

Alternatively, if the user response is determined at 88 to be "no," then at 94 the command stored at 74 is cleared, and, for example, the navigation system voices "command cancelled" at 96, whereby the process then ends at 98. The navigation system could alternatively use another interface rather than voicing a message such as "command cancelled."

If at any stage from 76 onwards the user accepts the disclaimer by a non-speech interface, then the process passes directly to 92, as represented by the dotted arrow connecting 76 and 92.

Figure 6:
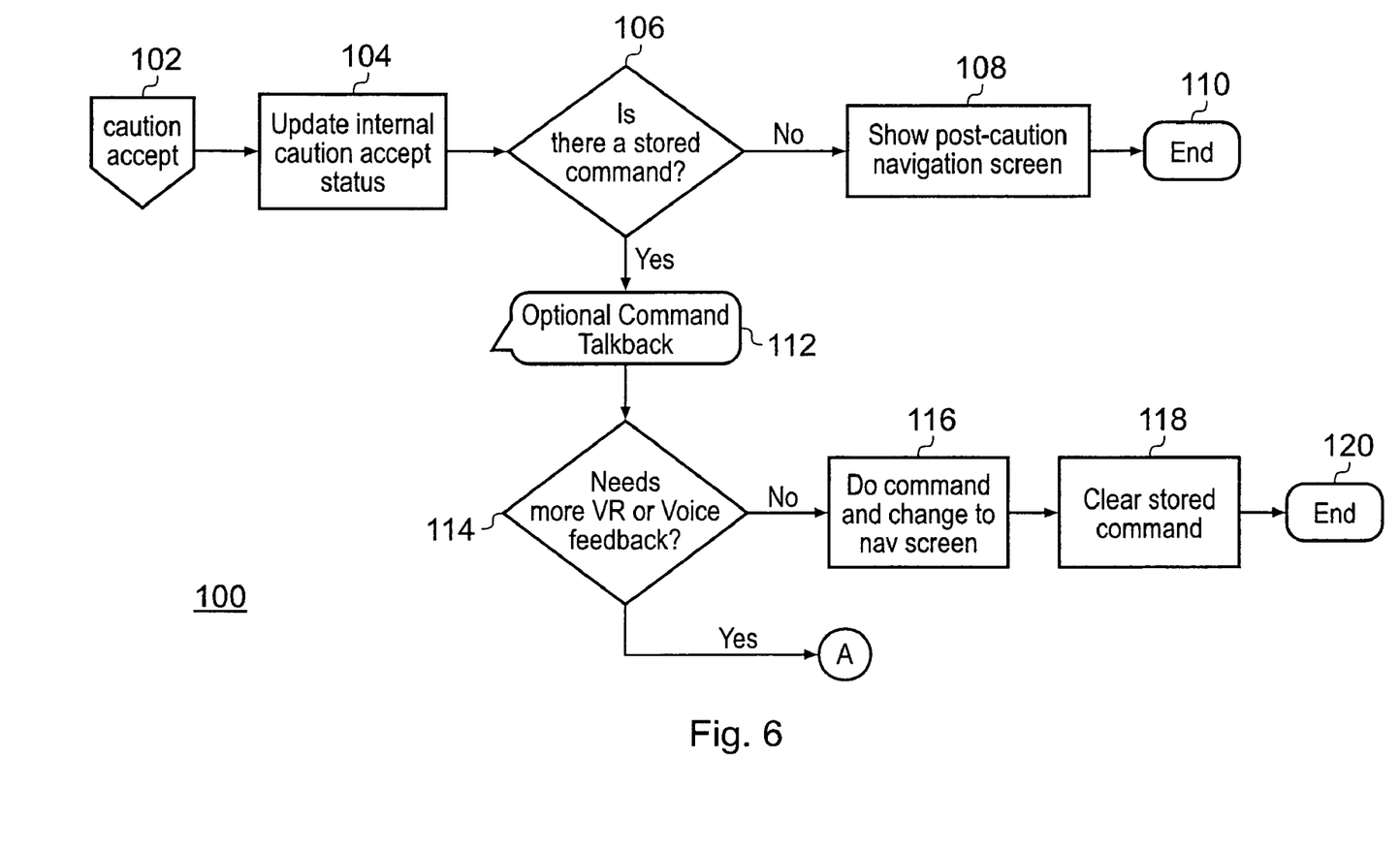
FIG. 6 is a flow diagram illustrating a portion of further exemplary operation of the navigation system of FIG. 4.
Figure 7:
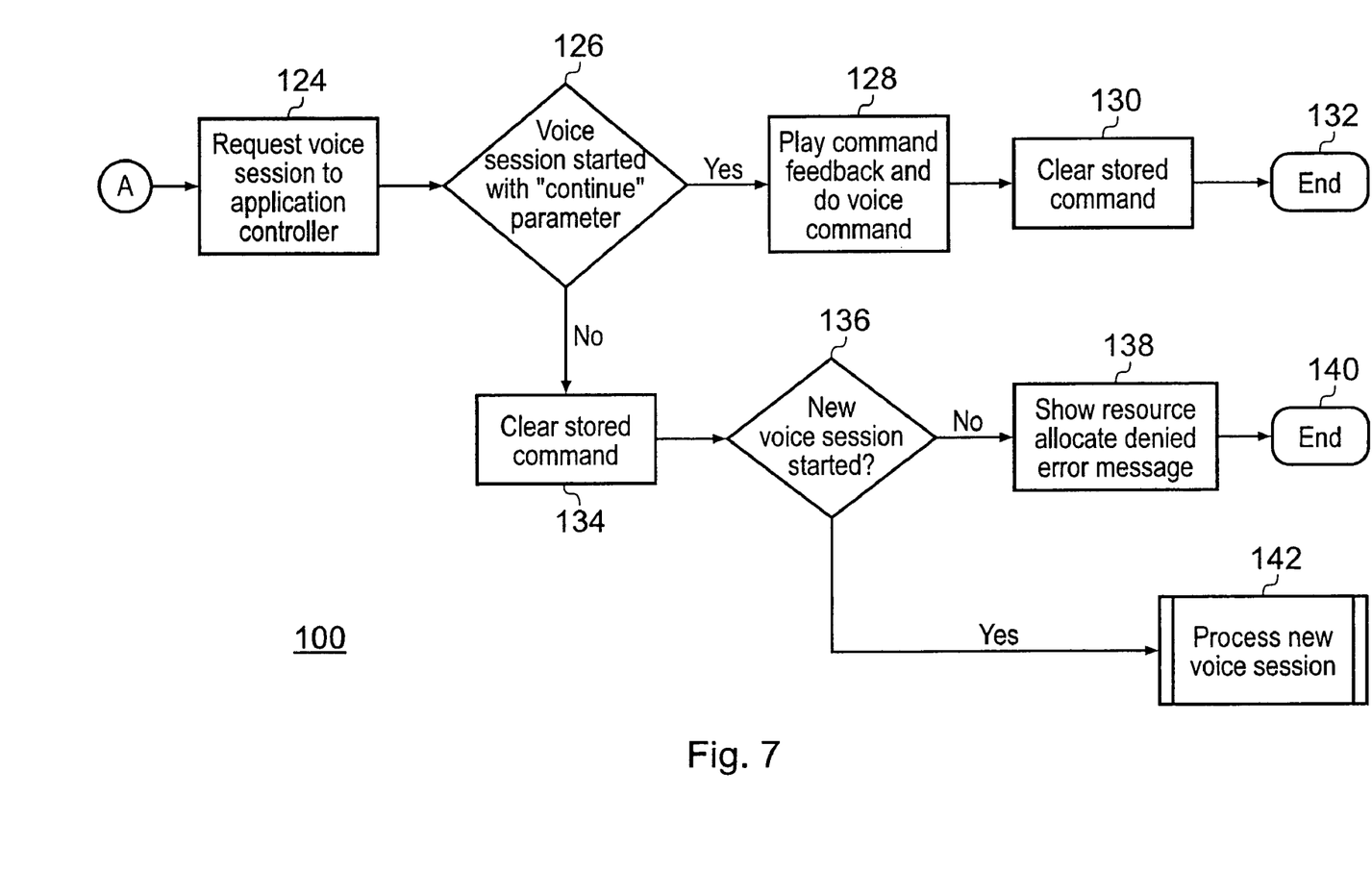
FIG. 7 is a flow diagram illustrating a continuation of the operation illustrated in FIG. 6.

FIGS. 6 and 7 represent a process 100 performed by the navigation system in the event that the caution is accepted. Accordingly, at 102 in FIG. 6, which corresponds to 92 in FIG. 5, the system recognizes that the caution is accepted.

At 104 the internal caution status is updated to an "accept" status. At 106, if it is determined that no command was stored at 74, then at 108 a post-caution navigation screen is displayed and at 110 the process ends. Alternatively, at 106, if it is determined that a command was stored at 74, then at 112 an optional command talk back is output by the speech control interface.

At 114 a determination is made by the system as to whether further voice request or voice feedback is required. This determination is based on pre-stored information held in the navigation system responsive to the nature of the stored command. If, at 114, it is determined that no further voice request or voice feedback is required, then at 116 the command is activated and an appropriate navigation screen is displayed. At 118 the command is cleared from the memory 48 and the process ends at 120.

Alternatively, if it is determined at 114 that a further voice request and/or voice feedback is required, then the process passes to the continuation of the process 100 represented in FIG. 7, with control being passed at point A.

Turning now to FIG. 7, following the point A, at 124 a further voice session is requested by an application controller, or directly to the speech system, according to particular implementation. An application controller can be implemented in software as part of the navigation system.

At 126, if it is determined that the voice session started with a "continue" parameter, then at 128 command feedback is played to the user, and a voice command is operated. At 128, if a speech session is allocated, and it is a continuation session, the speech system will start from the point where the initial command had been recognized. It is possible that a request for a continuation session may be denied. In this instance, the navigation system would inform the user that the speech system has been denied. At 130 the command stored at 74 is cleared and the process ends at 132.

Alternatively, if it is determined at step 126 that the voice session did not start with a "continue" parameter, then at 134 the command stored at 74 is cleared, and at 136 a determination is effected as to whether a new voice session should be started.

If it is determined at 136 that a new voice session should not be started, then at 138 a resource allocate denied error message is displayed at 138 and the process ends at 140. Alternatively, if it is determined at 136 that a new voice session should be started, then at 142 a new voice session is started.

In an exemplary embodiment, a navigation disclaimer status can be a final check, rather than an initial check. The memory 48 is configured to hold a unique identifier associated with a recognise command action. This is then used to store the navigation function that is to be activated if the disclaimer status is accepted. The system can be able to read out the disclaimer using one or both of synthetic and recorded speech. A confirmation sequence is provided to enable the user to accept the disclaimer using the speech interaction and the speech interaction can be able to start from a state where an initial command has already been recognized.

In another exemplary embodiment, where a disclaimer is accepted, regardless of an acceptance method, the navigation system can be operable to check the functions stored at 74 of FIG. 5.

Accordingly, there has been described a system having a speech control interface operable to provide a speech sequence to which a user response is required before a system functionality is operational. A user response can be provided via a spoken command. The system is operable, in response to interruption of the speech sequence to permit a user response using an alternative interface.

An exemplary embodiment provides a system including a speech control interface which can be operable in a single and/or multi-component system where a disclaimer or other information is imparted to a user that requires a user interaction. For example, it a can be applied to a speech control interface for in-vehicle components such as a navigation system and/or an audio and/or visual entertainment system. It finds particular but not exclusive application to in-vehicle systems that involve multiple components. It can further be applicable to systems other than in the automotive industry where a spoken interface is useful, for example for in-home control of domestic devices.

A computer program product for implementing the invention can be in the form of a computer program on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium Although the exemplary embodiments above have been described in considerable detail, numerous variations and modifications will become apparent to those skilled in the art once the above disclosure is fully appreciated. It is intended that the following claims be interpreted to embrace all such variations and modifications as well as their equivalents.

The invention claimed is:

1. A system comprising:
a speech control interface being operable to provide a speech sequence and to receive a corresponding user response, the user response being required before system functionality is operational; and
an alternative interface being operable to permit the user response to be a non-verbal user response to the speech sequence, wherein
the user response can be provided either via a spoken command or, in response to interruption of the speech sequence, via the alternative interface,
further wherein, in the following order:
the system recognizes a navigation command,
the system completes a status check for a disclaimer,
the system stores a command action corresponding to the navigation command when the status check is not accepted,
the system provides a disclaimer message to the user,
the system executes the navigation command when the user accepts the disclaimer message, and
the system cancels the navigation command when the user does not accept the disclaimer message.

2. The system of claim 1, wherein the alternative interface comprises a display operable to provide a visual representation of the speech sequence.

3. The system of claim 2, wherein the display is a touch screen display that is operable to display at least one button operable by a user to provide the non-verbal user response.

4. The system of claim 1, wherein the alternative interface comprises at least one switch operable by a user to provide the non-verbal user response.

5. The system of claim 1, wherein the speech control interface is operable to voice an acknowledgement of the user response.

6. The system of claim 1, further comprising:
a memory in communication with the speech control interface and operable to store a command representative of an operation to be performed following receipt of the user response; and
a processor in communication with the memory and being operable to retrieve the command in response to the user response.

7. The system of claim 1, wherein the speech sequence comprises a disclaimer.

8. The system of claim 7, further comprising:
a memory in communication with the speech control interface and being operable to receive the command input before the user response to the disclaimer, and to execute the command after input of the user response to the disclaimer.

9. The system of claim 1, wherein
the system recognizes a command from an user,
the system checks a status whether the command is operable,
the system stores the command when the command is not operable,
the system provides a message to the user in order to make the command operable,
the system executes the command when the system makes the command operable, and
the system cancels the navigation command when the system does not make the command operable.

10. The system of claim 1, wherein
the system is operable in response to interruption of the speech sequence by an external device or a status check for a disclaimer,
the system stores a command action when a status of the disclaimer is not accepted, and
the command action is continued after an end of the interruption caused by an external device or the disclaimer.

11. A system comprising:
a speech control interface being operable to provide a disclaimer in the form of a speech sequence for which a user acknowledgement is required before system functionality is operational;
a memory for storing a command input before the user acknowledgement; and
a processor being operable to receive the user acknowledgement and to execute the command after receiving the user acknowledgement,
further wherein, in the following order:
the system recognizes a navigation command,
the system completes a status check for a disclaimer,
the system stores a command action corresponding to the navigation command when the status is not accepted,
the system provides a disclaimer message to the user,
the system executes the navignation command when the user accepts the disclaimer message, and
the system cancels the navigation command when the user does not accept the disclaimer message.

12. The system of claim 11, wherein the system comprises a navigation system for a vehicle.

13. A method of operating a system that includes a speech control interface, the method comprising:
providing a speech sequence for which a user response is required before system functionality is operational, wherein the user response can be provided via a spoken command; and
in response to interruption of the speech sequence, permitting a user response using an alternative interface,
the method further comprising, in this order:
recognizing a navigation command;
completing a status check for a disclaimer;
storing a command action corresponding to the navigation command when the status check is not accepted;
providing a disclaimer message to the user;
executing the navigation command when the user accepts the disclaimer message; and
canceling the navigation command when the user does not accept the disclaimer message.

14. The method of claim 13, further comprising displaying a visual representation of the speech sequence.

15. The method of claim 14, wherein the permitting a user response using an alternative interface comprises:
displaying on a touch screen display at least one button operable by a user to provide the user response; and
accepting a user response via touching of the at least one button.

16. The method of claim 13, wherein the permitting a user response using an alternative interface comprises accepting the user response via at least one switch.

17. The method of claim 13, wherein the speech control interface is operable for voicing an acknowledgement of the user response.

18. The method of claim 13, further comprising storing a command representative of an operation to be performed following receipt of the user response, and retrieving the command following the receipt of the user response.

19. The method of claim 13, wherein the speech sequence comprises a disclaimer.

20. The method of claim 19, further comprising executing after a response to the disclaimer a command input stored before the input of the response to the disclaimer.

21. The method of claim 13, wherein the system is a navigation system for a vehicle.

22. The method of claim 13, the method further comprising:
recognizing a command from an user;
checking a status whether the command is operable;
storing the command when the command is not operable;
providing a message to the user in order to make the command operable;
executing the command when the system makes the command operable; and
canceling the navigation command when the system does not make the command operable.

23. The method of claim 13, wherein the system is operable in response to interruption of the speech sequence by an external device or a status check for a disclaimer, the method further comprising:
storing a command action when a status of the disclaimer is not accepted; and
continuing the command action after an end of the interruption caused by an external device or the disclaimer.

24. A method of operating a system that includes a speech control interface, the method comprising:
storing a command input before an acknowledgement of a disclaimer; and
executing the command after the acknowledgement of the disclaimer,
the method further comprising, in the following order:
recognizing a navigation command;
completing a status check for a disclaimer;
storing a command action corresponding to the navigation command when the status is not accepted;
providing a disclaimer message to the user;
executing the navigation command when the user accepts the disclaimer message; and
canceling the navigation command when the user does not accept the disclaimer message.

* * * * *